United States Patent
Pascas et al.

(10) Patent No.: US 11,526,479 B2
(45) Date of Patent: *Dec. 13, 2022

(54) SYSTEM AND METHOD FOR PREPARING A DATA SET FOR SEARCHING

(71) Applicant: Capital One Services, LLC, McLean, VA (US)

(72) Inventors: Renjith Katharin Pascas, Allen, TX (US); Liju Mathews, Plano, TX (US); Amit Ramesh Deshpande, McKinney, TX (US); Vipin Dwivedi, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/849,620

(22) Filed: Apr. 15, 2020

(65) Prior Publication Data

US 2021/0026822 A1 Jan. 28, 2021

Related U.S. Application Data

(63) Continuation of application No. 16/518,385, filed on Jul. 22, 2019, now Pat. No. 10,685,000.

(51) Int. Cl.
*G06F 16/22* (2019.01)
*G06F 16/2457* (2019.01)
*G06F 16/9537* (2019.01)
*G06F 16/9538* (2019.01)
*G06F 21/62* (2013.01)
*G06N 20/00* (2019.01)

(52) U.S. Cl.
CPC ........ *G06F 16/22* (2019.01); *G06F 16/24578* (2019.01); *G06F 16/9537* (2019.01); *G06F 16/9538* (2019.01); *G06F 21/6218* (2013.01); *G06N 20/00* (2019.01)

(58) Field of Classification Search
CPC ............... G06F 16/22; G06F 21/6218; G06F 16/24578; G06F 16/9538; G06F 16/9537; G06F 16/252; G06F 16/2272; G06N 20/00; G06N 7/005; G06N 20/10; G06N 5/003; G06N 5/025

See application file for complete search history.

(56) References Cited

U.S. PATENT DOCUMENTS

| | | |
|---|---|---|
| 2008/0162036 A1 | 7/2008 | Breed |
| 2013/0019233 A1 | 1/2013 | Pardehpoosh et al. |
| 2014/0201266 A1 | 7/2014 | Jackson et al. |
| 2016/0077728 A1 | 3/2016 | Padgett et al. |
| 2016/0105468 A1 | 4/2016 | Mufti et al. |
| 2016/0294605 A1 | 10/2016 | Searle et al. |
| 2019/0066495 A1 | 2/2019 | Elsheemy |

*Primary Examiner* — Jorge A Casanova (74) *Attorney, Agent, or Firm* — DLA Piper LLP (US)

(57) ABSTRACT

Embodiments of the present disclosure relate to systems and methods for preparing a data set for searching. In addition, embodiments of the present disclosure relate to solutions for configuring a storage infrastructure and indexing process for a data set.

20 Claims, 6 Drawing Sheets

SYSTEM AND METHOD FOR PREPARING A DATA SET FOR SEARCHING

CROSS-REFERENCE TO RELATED APPLICATION INFORMATION

This is a continuation of U.S. patent application Ser. No. 16/518,385, filed Jul. 22, 2019, which is incorporated herein by reference in its entirety.

BACKGROUND

Many institutions provide systems that store data sets and provide functionality for searching the data sets. However, the functionality used to load and search the data is often provided with a large, monolithic software code implementation. As a result, it can be difficult and time consuming to modify the implementation to load new data sets and/or to provide new search features.

SUMMARY

Embodiments of the present disclosure relate to systems and methods for preparing a data set for searching. In addition, embodiments of the present disclosure relate to solutions for configuring a storage infrastructure and indexing process for a data set.

In accordance with some embodiments of the present disclosure, there is provided a computer-implemented method for preparing a data set for searching. The method includes receiving, by a computer system comprising one or more processors, a request from a client device to upload a data set for use with an application. The method also includes determining, by the computer system, whether the client device is authorized to upload the data set, and sending, by the computer system, a request to the client device instructing a user to configure settings for the application. The method further includes receiving, by the computer system, the settings for the application, the settings configuring a storage infrastructure for storing data associated with the application and configuring an indexing process for indexing the data associated with the application, in response to selection of the settings by the user. The method still further includes receiving, by the computer system, the data set, and processing, by the computer system, the data set to store the data set as an indexed data set in accordance with the configuration for the storage infrastructure and in accordance with the configuration for indexing the data. The method also includes providing, by the computer system, a notification of a status of the processing of the data set for display to the user on the client device.

In accordance with aspects of the disclosure, the settings include one or more of a format of the data set, a frequency in which data sets will be loaded, a volume of data to be stored and searched, and a preferred notification channel for providing status updates to the user.

In accordance with further aspects of the disclosure, the format of the data set is one of a comma-separated values (CSV) format, a JavaScript Object Notation (JSON) format, a portable document file (PDF) format, a text file format, a hypertext markup language (HTML) format, or an extensible markup language (XML) format.

In accordance with still further aspects of the disclosure, the data set is a first data set, and the method includes receiving, by the computer system, a request to upload a second data set for use with the application, and identifying, by the computer system, that the settings have already been configured. The method also includes receiving, by the computer system, the second data set, and processing, by the computer system, the second data set to store the second data set as an indexed second data set in accordance with the settings. The method further includes providing, by the computer system, a notification of a status of the processing of the second data set for display to the user on the client device.

In accordance with aspects of the disclosure, the computer system is a first computer system, and the method includes receiving, by the first computer system, the data set from a second computer system, the second computer system receiving a portion of the data set from each of a plurality of client devices and combining the portions into the data set for providing to the first computer system.

In accordance with further aspects of the disclosure the method includes determining, by the computer system, after processing the data set, that at least a portion of the data set was not stored or was not indexed. The method also includes providing, by the computer system, the notification in response to determining that the at least a portion of the data set was not stored or was not indexed, the notification indicating that the processing of the data set was unsuccessful.

In accordance with still further aspects of the disclosure, the processing the data set to store the data set as an indexed data set in accordance with the determined configuration for the storage infrastructure and in accordance with the determined configuration for indexing the data includes breaking the data set into portions and processing the portions in parallel across one or more processors.

In accordance with aspects of the disclosure, representational state transfer (REST) application programming interfaces (APIs) are used by the computer system to store data into the storage infrastructure, to modify indexed data, and/or to retrieve indexed data in response to a search.

In accordance with further aspects of the disclosure, the data set includes data representing a vehicle inventory, and the method includes receiving, by the computer system, a search for data regarding vehicles within a proximity of a geographical location. The method also includes providing, by the computer system, a list of search results identifying vehicles within the proximity of the geographical location, the list of search results identifying the vehicles in an order based on the proximity of the vehicle to the geographical location.

In accordance with still further aspects of the disclosure, the client device is a first client device, the search is received from a second client device executing the application, and the list of search results are provided to the second client device.

In accordance with aspects of the disclosure, the method includes selecting, by the computer system, a number of computing devices on which to store the indexed data set, the number of computing devices selected being based at least in part on one or more of the settings received for configuring the storage infrastructure and the settings received for configuring the indexing.

In accordance with further aspects of the disclosure, each of the computing devices is one of a processor or a storage device.

In accordance with still further aspects of the disclosure, the method includes identifying, by the computer system, a first field of the indexed data set that is searched more frequently than a second field of the indexed data set. The method also includes adding, by the computer system in response to identifying the first field as being searched more frequently than the second field, an entry to a graphical user interface that allows a user on a client device to search for an attribute in the first field.

In accordance with aspects of the disclosure, the computer system identifies the first field as being searched more frequently than the second field by executing a machine learning algorithm across the indexed data set in the storage infrastructure.

Furthermore, in accordance with some embodiments, there is provided a computer system for preparing a data set for searching, including one or more memories storing instructions, and one or more processors that execute the instructions. The one or more processors, when executing the instructions, are configured to receive a request from a client device to upload a data set for use with an application and determine whether the client device is authorized to upload the data set. The one or more processors, when executing the instructions, are further configured to send a request to the client device instructing a user to configure settings for the application. The one or more processors, when executing the instructions, are still further configured to receive the settings for the application, the settings configuring a storage infrastructure for storing data associated with the application and configuring an indexing process for indexing the data associated with the application, in response to selection of the settings by the user. The one or more processors, when executing the instructions, are also configured to receive the data set, and process the data set to store the data set as an indexed data set in accordance with the configuration for the storage infrastructure, and in accordance with the configuration for indexing the data. The one or more processors, when executing the instructions, are further configured to provide a notification of a status of the processing of the data set for display to the user on the client device.

In accordance with aspects of the disclosure, the settings include one or more of a format of the data set, a frequency in which the data sets will be loaded, a volume of data to be stored and searched, and a preferred notification channel for providing status updates to the user.

In accordance with further aspects of the disclosure, the one or more processors, when executing the instructions are configured to receive a request to upload a second data set for use with the application and identify that the settings have already been configured. The one or more processors, when executing the instructions, are further configured to receive the second data set, and process the second data set to store the second data set as an indexed second data set in accordance with the settings. The one or more processors, when executing the instructions, are still further configured to provide a notification of a status of the processing of the second data set for display to the user on the client device.

In accordance with still further aspects of the disclosure, the one or more processors, when executing the instructions, are configured to select a number of computing devices on which to store the indexed data set, the number of computing devices selected being based at least in part on one or more of the settings received for configuring the storage infrastructure and the settings received for configuring the indexing.

In accordance with aspects of the disclosure, each of the computing devices is one of a processor or a storage device.

Further still, in accordance with some embodiments, there is provided a computer-implemented method for preparing a data set for searching, the method including receiving, by a computer system comprising one or more processors, a request from a client device to upload a data set for use with an application. The method also includes identifying, by the computer system, that settings for the application, including settings for configuring a storage infrastructure for storing data associated with the application, and for configuring an indexing process for indexing the data associated with the application, have been configured for the application. The method further includes receiving, by the computer system, the data set, and processing, by the computer system, the data set to store the data set as an indexed data set in accordance with the settings. The method still further includes providing, by the computer system, a notification of a status of the processing of the data set for display to a user on the client device.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments.

DETAILED DESCRIPTION

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Embodiments of the present disclosure relate to systems and methods for preparing a data set for searching. In addition, embodiments of the present disclosure relate to solutions for configuring a storage infrastructure and indexing process for a data set.

Many institutions provide systems that store data sets and provide functionality for searching the data sets. However, the functionality used to load and search the data is often provided with a large, monolithic software code implementation. As a result, it can be difficult and time consuming to modify the implementation to load new data sets and/or to provide new search features.

Embodiments of the present disclosure provide solutions for preparing data sets for searching. For example, some embodiments of the present disclosure provide for scaling a storage infrastructure and an indexing process based on aspects of the data set. Some embodiments of the present disclosure provide for a framework for loading and searching data sets that is scalable. Some embodiments of the present disclosure provide for a framework that allows a user or algorithm to modify the way data in a data set is stored or indexed without requiring a burdensome rewriting of the software code implementing the framework. Some embodiments of the present disclosure provide for a framework that allows a user or algorithm to modify a search interface for searching for data in the data set without requiring a burdensome rewriting of the software code implementing the framework.

Figure 1:
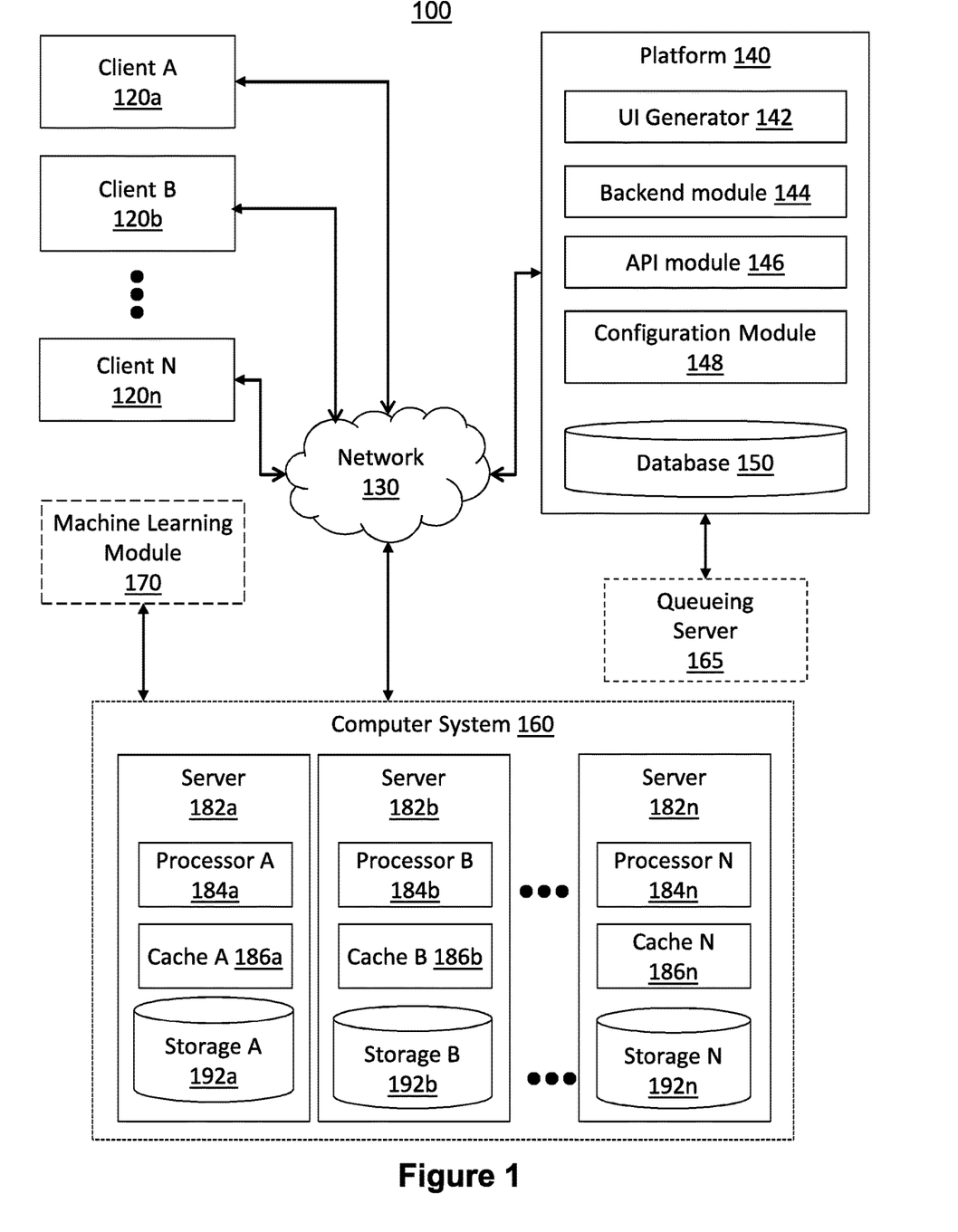
FIG. 1 illustrates a view of an example computing environment for preparing a data set for searching, consistent with embodiments of the present disclosure.

FIG. 1 illustrates a view of an example computing environment 100 for preparing a data set for searching, according to some embodiments of the present disclosure. The arrangement and number of components in environment 100 is provided for purposes of illustration. Additional arrangements, numbers of components, and other modifications can be made, consistent with embodiments of the present disclosure.

As shown in FIG. 1, computing environment 100 may include one or more client devices 120*a-n*, one or more networks 130, one or more platforms 140, and/or one or more computer systems 160 (e.g., a server system). In some embodiments, computing environment 100 may also include one or more of a queueing server 165 and a machine learning module 170. A platform 140 may be implemented using one or more servers and/or databases. In some embodiments, a platform 140 may be included within one or more computer systems 160. A computer system 160 may include a plurality of servers 182 and/or databases. In some embodiments, each server 182 may include one or more processors 184, caches 186, and storage devices 192. A platform 140 may include one or more user interface (UI) generators 142, backend modules 144, application programming interface (API) modules 146, configuration modules 148, and/or databases 150. In alternative configurations, different and/or additional components may be included in computing environment 100.

Each of the client devices may include a computing device, such as a hashing computer, a personal computer, a workstation, a laptop computer, a tablet computer, a notebook computer, a hand-held computer, a personal digital assistant, a portable navigation device, a mobile phone, a smart phone, a wearable computing device (e.g., smart watch, wearable activity monitor, wearable smart jewelry, glasses, optical head-mounted displays (OHMDs)), an embedded computing device (e.g., in communication with a smart textile or electronic fabric), a point-of-sale terminal (POS), and/or any other type of computing device that may be configured to store data and software instructions, execute software instructions to perform operations, and/or display information on a display device. In some configurations, one or more of the client devices may execute a stored software application capable of configuring a storage infrastructure and/or an indexing process for preparing a data set for searching. In some configurations, one or more of the client devices may execute a stored software application capable of searching for data from the data set once the data set has been indexed.

Each of the client devices may include one or more tangible, non-transitory memories that store data and/or software instructions, and one or more processors configured to execute the software instructions. A client device may include one or more display devices that display information to a user and one or more input devices (e.g., keypad, keyboard, touchscreen, voice activated control technologies, or any other type of known input device) to allow the user to input information to the client device. In one aspect, a client device may store in memory one or more software applications that are executed by the one or more processors. In some embodiments, one or more of the client devices may be implemented using a computer system, such as computer system 500 of FIG. 5.

Each of the one or more client devices, platform(s) 140, and computer system(s) 160, can communicate via network(s) 130, which may include any combination of local area and/or wide area networks, using both wired and/or wireless communication systems. In one embodiment, network(s) 130 may use standard communications technologies and/or protocols. For example, network(s) 130 may include communication links using technologies such as Ethernet, 802.11, worldwide interoperability for microwave access (WiMAX), 3G, 4G, code division multiple access (CDMA), and digital subscriber line (DSL). Examples of networking protocols used for communicating via network 130 include multiprotocol label switching (MPLS), transmission control protocol/Internet protocol (TCP/IP), hypertext transfer protocol (HTTP), hypertext transfer protocol secure (HTTPS), simple mail transfer protocol (SMTP), and file transfer protocol (FTP). Data exchanged over network 130 may be represented using any suitable format, such as hypertext markup language (HTML), extensible markup language (XML), portable document file (PDF) format, comma-separated values (CSV) format, JavaScript Object Notation (JSON) format, or a text file format. In some embodiments, all or some of the communication links of network 130 may be encrypted using any suitable technique or techniques.

In some embodiments, network(s) 130 may be the Internet with network(s) 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, which may consist of thousands of commercial, governmental, educational, and other computer systems that route data and messages. Of course, network(s) 130 may be implemented as a number of different types of networks, such as for example, Internet, intranet, local area network (LAN), wide area network (WAN), Ethernet, twisted-pair, coaxial cable, fiber optic, cellular, satellite, IEEE 802.11, terrestrial, and/or other types of wired or wireless networks. It should be noted that network 130 may include any number of additional server devices, client devices, and other devices. In some embodiments, program code located in network(s) 130, on platform(s) 140, or in computer system(s) 160 may be stored on a computer recordable storage medium and downloaded to a client device for use.

A platform 140 may be a system that performs dynamic configuration of data sets received from a client of an institution, such as a financial institution. A platform 140 may be implemented in one or more servers and/or one or more databases. A platform 140 may process data sets received from one or more client devices to store the data sets into a storage infrastructure (e.g., computer system 160) and/or to index the data sets for searching. For example, a platform 140 may process vehicle inventory data received in one or more vehicle inventory files for storage into a storage infrastructure and may index that data for searching by client devices. The client of the institution may provide the data set through use of one of the client devices. A platform 140 may generate a report including populated vehicle inventory data and may present the generated report to a client device through a user interface. As described below in conjunction with FIG. 2, responsive to receiving a request from a client application running on a client device, a platform 140 may perform at least one of a loading (e.g., storing and/or indexing) of the data set into a server system 160, a retrieval of data in the indexed data set from a server system 160, and a modification of the data in the indexed data set in a server system 160.

In some embodiments, a platform 140 may utilize a set of distributed applications to process a data set for storage and/or indexing. For example, a large data set may require a lot of a processing power for the data to be indexed into a searchable form and stored into a storage infrastructure. In some embodiments, the data set may be broken into portions, and portions of the data set can be distributed to distributed applications that are executing concurrently. The distributed applications may be distributed, for example, across one or more processors, computers, servers, and/or databases. In some embodiments, a toolkit such as Akka may be used to process a data set for storage and indexing. Utilizing a set of distributed applications to process the data set may allow the data set to be processed more quickly than would otherwise be possible.

Indexing may involve, for example converting text in a document, such as fields and attributes, into data structures including searchable forms of the text. In some embodiments, searchable metadata associated with text from a document may also be generated as part of the indexing process. Indexing may generate data in a form that can be used with advanced search features, such as faceting, grouping, fuzzy search, synonym searching, and/or ranking.

Referring again to FIG. 1, UI generator 142 may generate user interfaces that receive a data set and/or search criteria from a client device associated with a client of an institution, such as a financial institution. The client can be a dealer of automobiles (e.g. cars, motorcycles, etc.), a customer of the institution, or some combination thereof. In some embodiments, the client may use a client device or platform to gather data from a number of other client devices and to combine that data into a combined data set. The client device may then provide that combined data set to a platform 140 and/or server system 160 for processing. In some configurations, the client may upload a data set and/or search criteria through one or more user interfaces generated by UI generator 142. A platform 140 may cause the user interface to be displayed on a client device by transmitting commands, graphic primitives, or instructions that cause the UI to be rendered on the client device. In one example, a data set may include one or more vehicle inventory files associated with one or more vehicle dealers or customers of vehicles.

Backend module 144 may receive a request for storing a data set and/or for indexing a data set from a client device. In some embodiments, backend module 144 may be communicatively coupled to a queueing server 165. Backend module 144 may, for example, communicate processing instructions to queueing server 165 to perform one or more operations (e.g., upload data to a storage infrastructure, index the data) on the search dataset received from the client device.

API module 146 may include one or more APIs that may provide representational state transfer (REST) end-points (e.g., unique uniform resource identifiers (URIs) that represent one or more objects) to perform operations on the data set received from a client device. For example, a REST end-point may be configured to perform an operation to insert, update, and/or retrieve data stored in a computer system 160. REST is an example of a software architectural style that may be used to define a set of constraints to be used for services, and that may allow a requesting system to access and manipulate textual representations of resources, such as documents, files, data, or data that is indexed, by using a uniform and predefined set of stateless operations. A REST end-point may be used, for example, to request an operation on a resource, such as a GET, POST, PUT, or DELETE operation. The resource may be identified, for example, using a URI.

Configuration module 148 may perform a configuration of one or more storage and/or searching criteria. For example, configuration module 148 may determine an underlying storage infrastructure based on a volume of the data set and/or a search criteria received from a client device. Configuration module 148 may process data for storage in a storage infrastructure (e.g., computer system 160) or for indexing data based on one or more criteria set by a user on a client device, such as one or more of a type of data in a data set, a frequency at which data sets are expected to be uploaded, a volume of the data sets expected to be loaded, or a notification channel for notifying a user of a status of processing the data.

Computing environment 100 may include one or more databases. One or more databases, such as database 150, may be included in a platform 140 and/or in a computer system 160. A database may include any combination of one or more types of databases, such as hierarchical databases, network databases, relational databases, or object-oriented databases. A database 150 may store data, such as automobile inventory data, that has been indexed for searching. A database may be searchable, such that a server or client device may submit a query to the database to lookup data. In response to such a query, a server or client device may receive a list of data that may match the submitted query. A database may be implemented in software, or in a combination of software or hardware. In some embodiments, one or more databases may be implemented using a computer system, such as computer system 500 of FIG. 5.

Platform(s) 140 and/or computer system(s) 160, may include one or more servers. For example, a computer system 160 may include one or more servers 182*a-n* that may execute software instructions to perform one or more processes in accordance with various embodiments. By way of example, a server may include any combination of one or more web servers, mainframe computers, general-purpose computers, personal computers, or other types of computing devices. In some embodiments, one or more servers may be configured to host a web page, implement a search engine, store data or indexed data, and/or retrieve data or indexed data. In some embodiments, a server may be a standalone computing system or apparatus, or it may be part of a larger system. For example, one or more servers may be distributed servers that are remotely located, where the distributed servers communicate with one another over a communications network, such as a LAN. One or more servers may be one or more back-end servers for carrying out one or more aspects of the present disclosure. In some embodiments, a server may include one or more processors 184*a-n*, one or more caches 186*a-n*, or one or more storage devices 192*a-n*.

One or more servers may be implemented as a server system comprising a plurality of servers, or a server farm comprising a load balancing system and a plurality of servers. In some embodiments, a server may be implemented with hardware and/or software applications running thereon. In some embodiments, one or more servers may be implemented using a computer system, such as computer system 500 of FIG. 5.

In some embodiments, a computer system 160 or platform 140 may implement a distributed cluster-computing framework for indexing and storing the data in a data set. The framework may provide for data parallelism and fault tolerance. In some embodiments, the framework may be implemented using the Apache Spark framework.

In some embodiments, a computer system 160 or platform 140 may implement one or more distributed, in-memory key-value databases for maintaining data structures containing the indexed data from the data sets. In some embodiments, the distributed, in-memory key-value database may be implemented using Remote Dictionary Server (Redis).

In some embodiments, a computer system 160 or platform 140 may implement a search platform. In some embodiments, the search platform may be implemented using Apache Solr.

In some embodiments, a platform 140 or server system 160 may be communicatively coupled to a machine learning module, such as machine learning module 170. In some configurations, a machine learning module may use one or more machine learning algorithms to identify frequently searched fields of indexed data and suggest text search patterns to client devices. A machine learning module, such as machine learning module 170, may include one or more computer systems (e.g., computer system(s) 500 of FIG. 5) configured to train a prediction model. To train the prediction model, the machine learning module may receive, as input, one or more streams of search strings input by users. The one or more streams of search strings may correspond to numbers, dates, terms, words, or phrases, input by users in conducting searches. The streams of search strings may include search strings entered by users in the past, and search strings recently entered by users. In some embodiments, every search string entered by a user may be input to the prediction model, such that the model is updated over time to reflect the current search interests of users. The machine learning module may implement one or more machine learning algorithms to train the prediction model. For example, the machine learning module may use one or more of a decision tree learning model, association rule learning model, artificial neural network model, deep learning model, inductive logic programming model, support vector machine model, clustering model, Bayesian network model, reinforcement learning model, representational learning model, similarity and metric learning model, rule based learning model, and the like.

Figure 2:
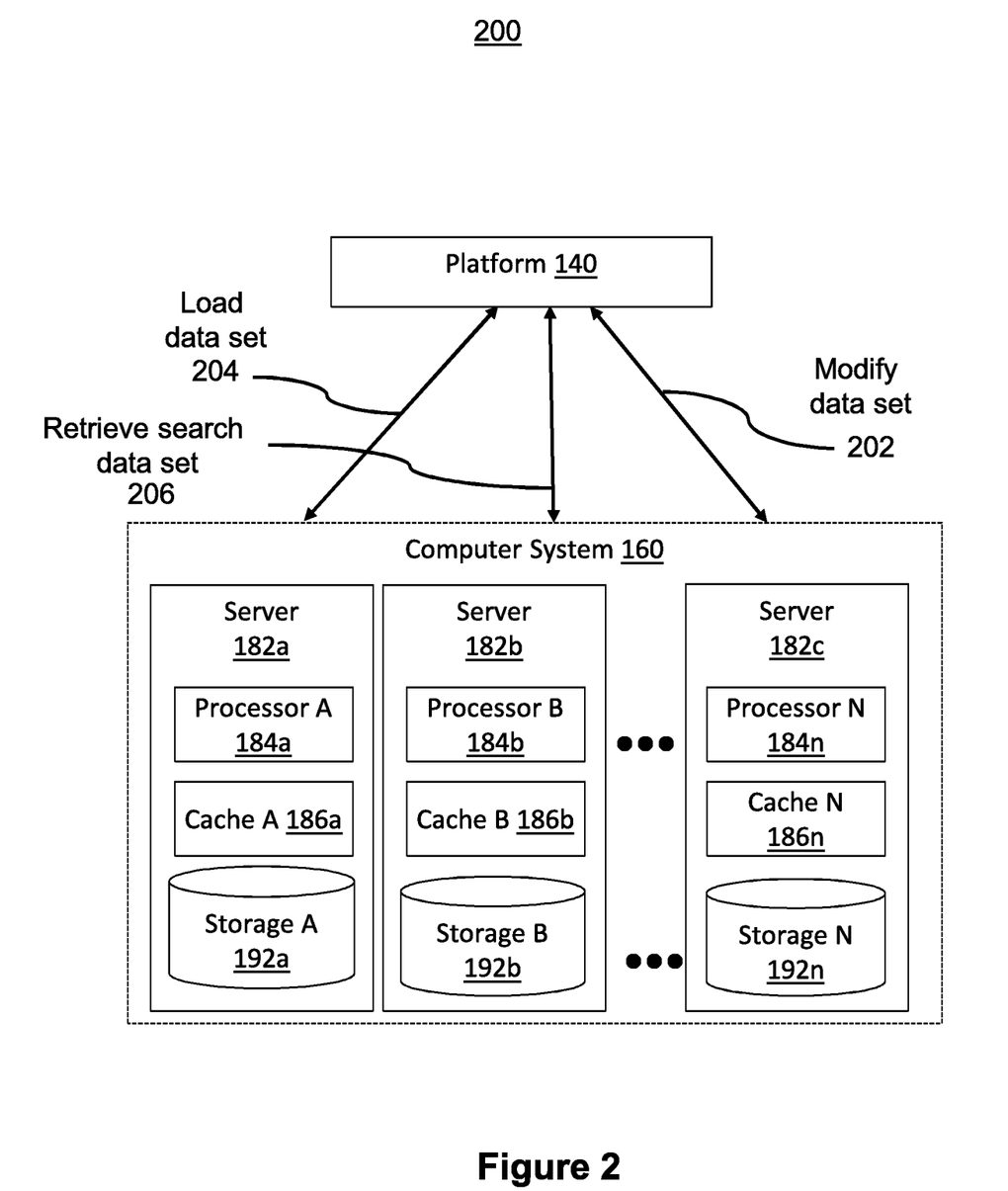
FIG. 2 illustrates a view of another example computing environment for preparing a data set for searching, consistent with embodiments of the present disclosure.

FIG. 2 illustrates a view of another example computing environment 200, consistent with embodiments of the present disclosure. Example computing environment 200 illustrates in greater detail communications between a platform 140 and a computer system 160, consistent with embodiments of the present disclosure. For example, platform 140 can provide REST end-points to a computer system 160. A REST end-point may refer to a set of unique URIs that represent one or more objects exposed to an API of an API module, such as API module 146.

For example, a platform 140 may provide a REST end-point for loading 204 a data set into a storage infrastructure, such as computer system 160 and/or to index the data set for search. A platform 140 may also provide a REST end-point for modifying 202 indexed data. A platform 140 may also provide a REST end-point for retrieving 206 indexed data. For example, a platform 140 may use a POST operation to a particular URI to perform a desired function on the indexed data.

Figure 3:
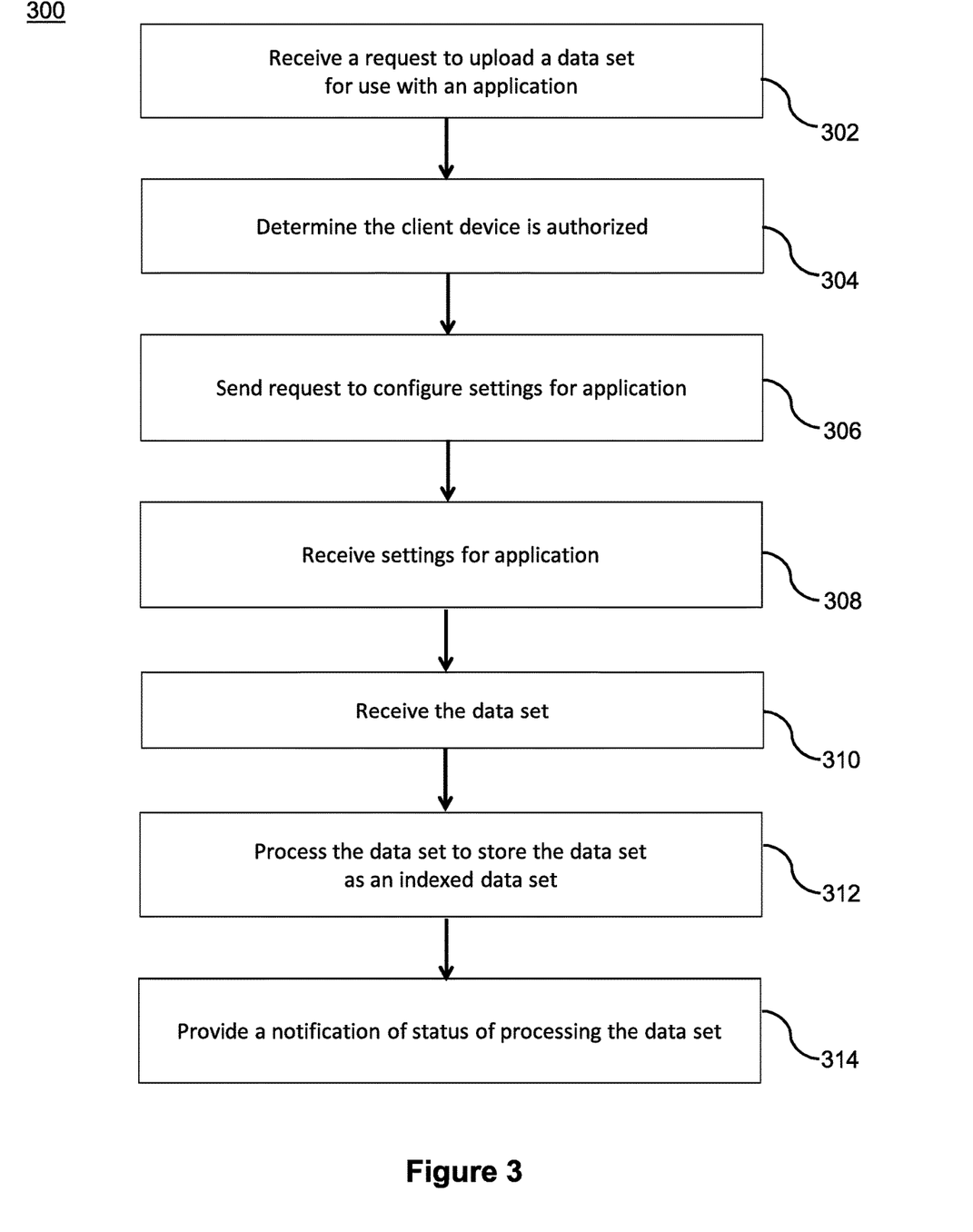
FIG. 3 illustrates a flow diagram of an example method for preparing a data set for searching, consistent with embodiments of the present disclosure.

FIG. 3 illustrates a flow diagram of an example method 300 for preparing a data set for searching, consistent with embodiments of the present disclosure. Example method 300 may be implemented in a computing environment (see, e.g., FIGS. 1, 2) using one or more computer systems (see, e.g., FIG. 5). In some embodiments, method 300 may be performed by platform 140 or by computer system 160.

In step 302, a request to upload a data set may be received. The request may be received, for example, by a platform 140 or a computer system 160 from a client device (e.g., client device 120*a-n*). In some embodiments, the request may be to upload a data set for use in connection with an application. For example, the request could be received from a client device associated with an entity that collects automobile inventory data from a variety of other client devices, such as client devices associated with car dealers. The entity may receive automobile inventory data from a client device associated with each of a plurality of car dealers and may then combine that data into one combined data set. The entity may then wish to upload that data set to a platform 140 and/or computer system 160, so that it may be indexed and stored for searching. To do so, the entity may use the client device to send a request to platform 140 or server system 160 to upload the data set. In some embodiments, the request may indicate an application the data set is to be associated with. The application may be, for example, an application that can be installed on client devices, such that the client devices can search through the data set. Although the example above describes an entity that collects data from multiple client devices and combines that data into one combined data set, the disclosure is not so limited. Any client device 120*a-n* may be capable of uploading a data set for indexing and storage, consistent with the embodiments disclosed herein.

In step 304, a determination can be made as to whether the client device requesting to upload the data set is authorized to do so. For example, a platform 140 or computer system 160 may receive a credential from a client device and may compare that credential with a list of credentials to determine whether the client device is authorized to upload the data set. The credential may include, for example, one or more of a username, a password, an address of the client device, or any other information that may uniquely identify the client device or the user of the client device. In some embodiments, platform 140 or computer system 160 may send the credential to a third-party authentication system using an API and may receive a response from the third-party authentication system indicating whether or not the client device is authorized. Using the example discussed above, platform 140 or computer system 160 may be configured to restrict access for uploading automobile inventory data to car dealers, or to entities that aggregate inventory data from car dealers. Accordingly, a credential may be checked to determine whether the client device is authorized to upload automobile inventory data.

In step 306, a request may be sent to the client device instructing a user to configure settings for the application with which the data set is to be associated. For example, a platform 140 or computer system 160 may send a request asking a user to select one or more of a format of data sets to be uploaded, a frequency at which data sets are expected to be uploaded, an expected volume of a data set to be uploaded, a notification channel to be used for notifying a user of a status of processing the data set for storage and indexing for search, or a time within which search results should be provided. The format of the data sets to be uploaded may include, for example, a comma-separated values (CSV) format, a JavaScript Object Notation (JSON) format, a hypertext markup language (HTML) format, an extensible markup language (XML) format, a portable document file (PDF) format, or any other format used in representing text, tags, or attributes in a file. The frequency at which the data set is expected to be loaded could be, for example, hourly, weekly, daily, monthly, or any other period of time. The volume of the data set expected to be loaded could be, for example, one million records, ten million records, or one hundred million records. The notification channel could be, for example, email, text message, or push notification. The user may enter an email address, telephone number, or other contact information in identifying a notification channel. The time within which search results should be provided could be, for example three hundred milliseconds or two seconds.

In step 308, the settings for the application with which the data set is to be associated may be received. For example, a platform 140 or computer system 160 may receive the settings input by the user in response to the request sent in step 306. Platform 140 and/or computer system 160 may use the received settings to determine a configuration of the storage infrastructure and/or indexing process for data sets associated with the application. For example, if the user indicated that a data set of one hundred million records is expected to be stored and indexed, a greater number of processors and/or storage devices may be used for storing, retrieving, and searching the data than if the user indicated that a data set of one million records is expected to be stored and indexed. A greater amount of processing power may be required to store and search a greater volume of data. Therefore, in this example, platform 140 and/or computer system 160 may be configured to use a greater number of processors and/or storage devices for storing and searching a larger volume of data, in order to provide the same quality of service (e.g., search results within three hundred milliseconds) irrespective of the volume of data being stored. A platform 140 and/or computer system 160 may also be configured to differ the storage infrastructure and/or indexing process for a data set depending on any other settings selected by the user.

In step 310, the data set may be received. For example, a platform 140 and/or computer system 160 may receive a data set from a client device over network(s) 130.

In step 312, the data set may be processed to store the data set as an indexed data set in accordance with the configuration for the storage infrastructure and/or in accordance with the configuration for indexing the data. For example, a platform 140 and/or computer system 160 may process the data set. The data set may be processed to be stored, for example, as an indexed data set across computing devices including a certain number of processors or storage devices, the number of processors or storage devices being selected based on the settings selected by the user. The indexing logic for the data set may also vary depending on the settings selected by the user. For example, the data set may be indexed for particular search features, such as faceting, grouping, fuzzy search, synonym searching, and/or ranking, depending on settings selected by the user for the application.

In step 314, a notification of a status of the processing of the data set may be provided. For example, a platform 140 and/or computer system 160 may send a notification to a client device associated with a user indicating whether the processing of the data set in step 312 was successful, whether the processing of the data set in step 312 failed, or a time taken to process the data set in step 312. A notification may also be sent to indicate that processing of the data set is pending. The notification may be sent, for example, by email, text message, or push notification. In some embodiments, the notification may be provided as a part of a user interface on the client device used for uploading the data set.

Figure 4A:
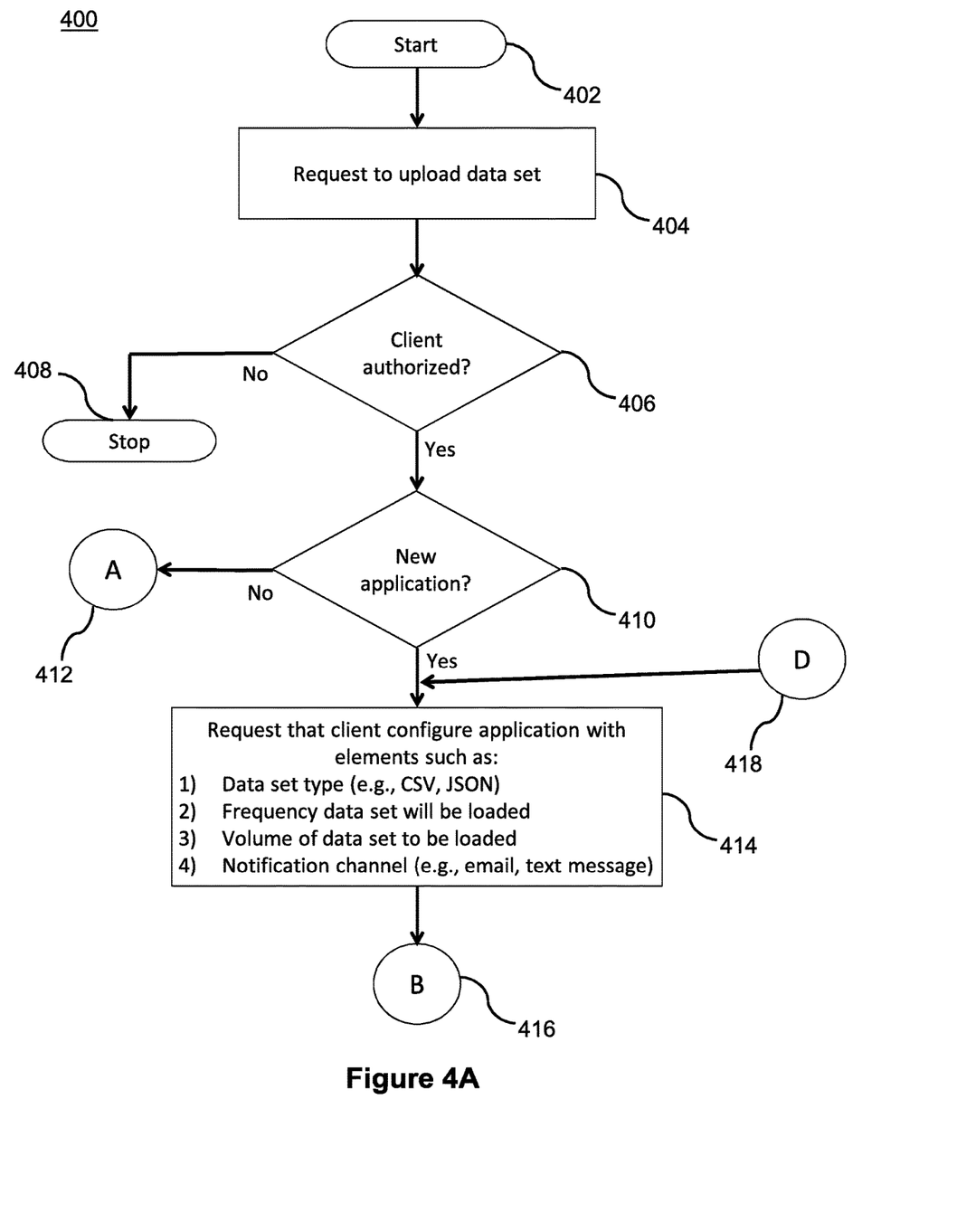
FIGS. 4A and 4B illustrate a flow diagram another example method for preparing a data set for searching, consistent with embodiments of the present disclosure.
Figure 4B:
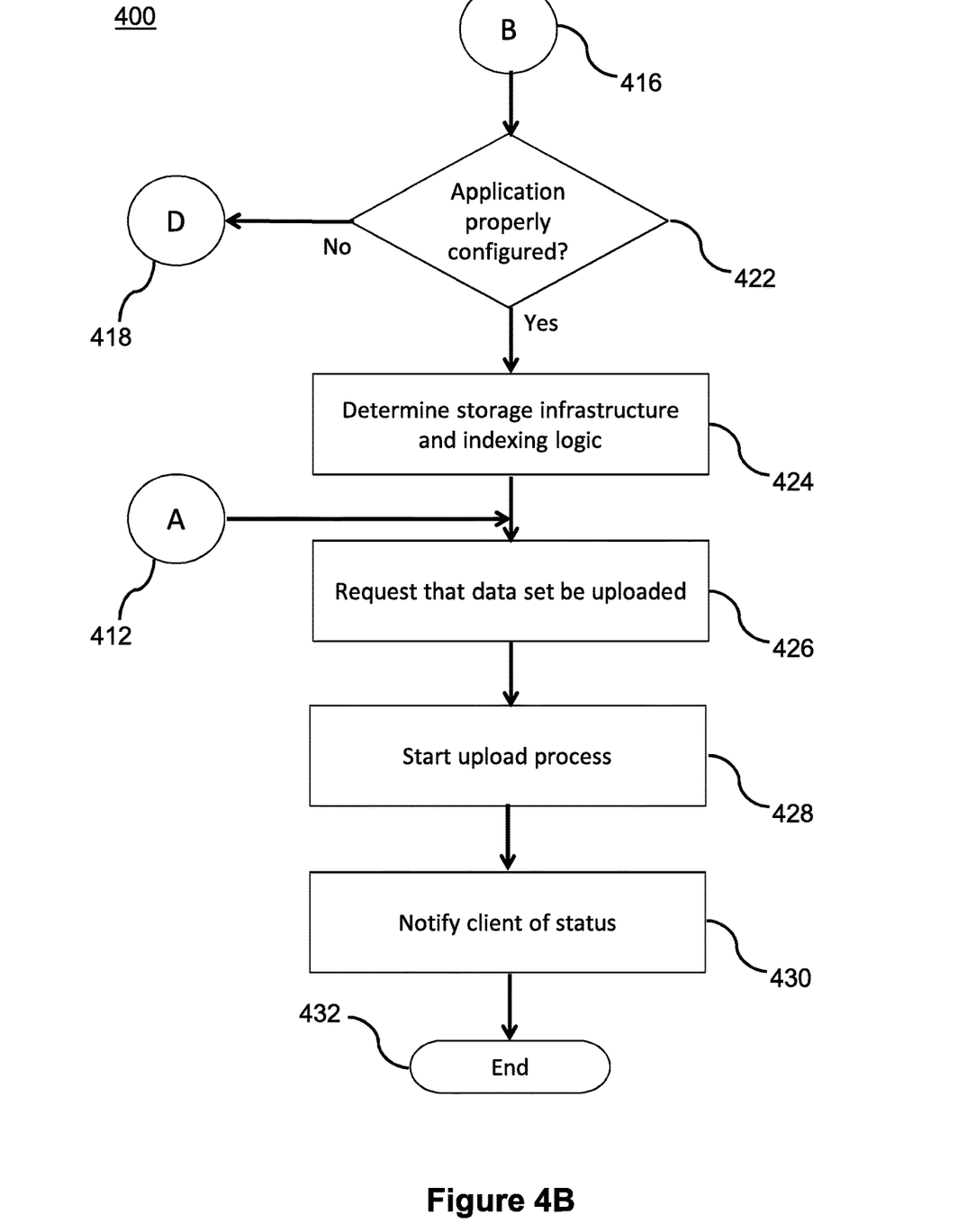

FIGS. 4A and 4B illustrate a flow diagram of another example method 400 for preparing a data set for searching, consistent with embodiments of the present disclosure. Example method 400 may be implemented in a computing environment (see, e.g., FIGS. 1, 2) using one or more computer systems (see, e.g., FIG. 5). In some embodiments, method 400 may be performed by a platform 140 or a computer system 160.

In step 402, method 400 may start. In step 404, a request to upload a data set may be received. The request may be received, for example, by a platform 140 or a computer system 160 from a client device (e.g., client device 120*a-n*). In some embodiments, the request may be to upload a data set for use in connection with an application. For example, the request could be received from a client device associated with an entity that collects automobile inventory data from a variety of other client devices, such as client devices associated with car dealers. The entity may receive automobile inventory data from a client device associated with each of a plurality of car dealers and may then combine that data into one combined data set. The entity may then wish to upload that data set to a platform 140 and/or computer system 160, so that it may be indexed and stored for searching. To do so, the entity may use the client device to send a request to a platform 140 or a server system 160 to upload the data set. In some embodiments, the request may indicate an application the data set is to be associated with. The application may be, for example, an application that can be installed on client devices, such that the client devices can search through the data set. Although the example above describes an entity that collects data from multiple client devices and combines that data into one combined data set, the disclosure is not so limited. Any client device 120*a-n* may be capable of uploading a data set for indexing and storage, consistent with the embodiments disclosed herein.

In step 406, a determination can be made as to whether the client device requesting to upload the data set is authorized to do so. For example, a platform 140 or computer system 160 may receive a credential from a client device and may compare that credential with a list of credentials to determine whether the client device is authorized to upload the data set. The credential may include, for example, one or more of a username, a password, an address of the client device, or any other information that may uniquely identify the client device or the user of the client device. In some embodiments, a platform 140 or a computer system 160 may send the credential to a third-party authentication system using an API and may receive a response from the third-party authentication system indicating whether or not the client device is authorized. Using the example discussed above, a platform 140 or a computer system 160 may be configured to restrict access for uploading automobile inventory data to car dealers, or to entities that aggregate inventory data from car dealers. Accordingly, a credential may be checked to determine whether the client device is authorized to upload automobile inventory data. If it is determined that the client device or user using the client device is not authorized to upload the data set, the method may end in step 408. If it is determined that the client device or user using the client device is authorized to upload the data set, the method may proceed to step 410.

In step 410, a determination may be made as to whether the application the user identified for association with the data set is an application for which settings have already been received. For example, a platform 140 or computer system 160 may compare an application identified by the user with a list of applications stored in a database. If there is a match, then in step 412, the settings for that application may be retrieved and method 400 may proceed to step 426, where platform 140 or computer system 160 may request that the client device upload the data set, and where the data set may be processed for storage in a storage infrastructure and/or for indexing using an index logic determined on the basis of the retrieved settings. This may be the case where a user has previously provided settings for the application when uploading a prior data set for the application. If the application the user identified for association with the data set is not an application for which settings have already been received, method 400 may proceed to step 414.

In step 414, a request may be sent to the client device instructing a user to configure settings for the application with which the data set is to be associated. For example, a platform 140 or computer system 160 may send a request asking a user to select one or more of a format of data sets to be uploaded, a frequency at which data sets are expected to be uploaded, an expected volume of a data set to be uploaded, a notification channel to be used for notifying a user of a status of processing the data set for storage and indexing for search, and/or a time within which search results should be provided. The format of the data sets to be uploaded may include, for example, a comma-separated values (CSV) format, a JavaScript Object Notation (JSON) format, a hypertext markup language (HTML) format, an extensible markup language (XML) format, a portable document file (PDF) format, or any other format used in representing text, tags, or attributes in a file. The frequency at which the data set is expected to be loaded could be, for example, hourly, weekly, daily, monthly, or any other period of time. The volume of the data set expected to be loaded could be, for example, one million records, ten million records, or one hundred million records. The notification channel could be, for example, email, text message, or push notification. The user may enter an email address, telephone number, or other contact information in identifying a notification channel. The time within which search results should be provided could be, for example three hundred milliseconds or two seconds.

In step 416, method 400 may proceed to step 422. In step 422, it may be determined whether the settings for the application have been properly configured. For example, a platform 140 or computer system 160 may determine whether the settings entered by the user for configuring the storage infrastructure and/or indexing logic associated with data sets for the application have been properly saved. If the answer is no, then in step 418 method 400 may return to step 414, and another request may be sent to the client device requesting settings for the application. If the application has been properly configured and the answer is yes, method 400 may proceed to step 424.

In step 424, a storage infrastructure and indexing logic may be determined. For example, platform 140 and/or computer system 160 may use the received settings to determine a configuration of the storage infrastructure and/or indexing process for data sets associated with the application. For example, if the user indicated that a data set of one hundred million records is expected to be stored and indexed, a greater number of processors and/or storage devices may be used for storing, retrieving, and searching the data than if the user indicated that a data set of one million records is expected to be stored and indexed. A greater amount of processing power may be required to store and search a greater volume of data. Therefore, in this example, platform 140 and/or computer system 160 may be configured to use a greater number of processors and/or storage devices for storing and searching a larger volume of data, in order to provide the same quality of service (e.g., search results within three hundred milliseconds) irrespective of the volume of data being stored. A platform 140 and/or computer system 160 may also be configured to differ the storage infrastructure and/or indexing process for a data set depending on any other settings selected by the user.

In step 426, a request that a data set be uploaded may be sent. For example, a platform 140 or computer system 160 may send a request to the client device requesting that the client device upload the data set.

In step 428, the upload process may be started. For example, the data set may be received by platform 140 and/or computer system 160 from the client device over network(s) 130. The received data set may be processed to store the data set as an indexed data set in accordance with the configuration for the storage infrastructure and/or in accordance with the configuration for indexing the data. For example, a platform 140 and/or computer system 160 may process the data set. The data set may be processed to be stored, for example, as an indexed data set across computing devices including a certain number of processors or storage devices, the number of processors or storage devices being selected based on the settings selected by the user. The indexing logic for the data set may also vary depending on the settings selected by the user. For example, the data set may be indexed for particular search features, such as faceting, grouping, fuzzy search, synonym searching, and/or ranking, depending on settings selected by the user for the application.

In step 430, a notification of the status of the upload may be sent to a client device associated with a user. For example, a platform 140 and/or computer system 160 may send a notification to a client device associated with a user indicating whether the processing of the data set was successful, whether the processing of the data set failed, or a time taken to process the data set. A notification may also be sent to indicate that processing of the data set is pending. The notification may be sent, for example, by email, text message, or push notification. In some embodiments, the notification may be provided as a part of a user interface on the client device used for uploading the data set. In step 432, once the data set has been processed, method 400 may end.

Once the data set has been indexed and stored into the storage infrastructure, a user may use an application on a client device to search the indexed data. Using the example previously described, a user may use an application for searching an automobile inventory to search data about automobiles in the data set. The user may search for any data related to automobiles that was indexed as part of the processing of the data set. For example, a user may search for information about automobiles in the inventory based on model, make, and year. As another example, a user may search for automobiles based on a proximity to a geographic location, and a platform 140 and/or computer system 160 may provide a list of search results to the user's client device identifying automobiles in an order based on the proximity of the vehicle to the geographical location. In some embodiments, a platform 140 or a computer system 160 may search only a portion of the indexed data to enhance a processing speed of the search. For example, a platform 140 or a computer system 160 may search only the make, model, and year of the automobile vehicle inventory data, recognizing that these are the most commonly searched fields. In some embodiments, additional search fields may be added in response to a request from a client. For example, a user may request to search a seat type of automobiles (e.g., leather, nylon, polyester). In response, platform 140 or computer system 160 may perform a REST API operation to add seat type as data to search in the indexed data. In some embodiments, platform 140 or computer system 160 may execute a machine learning algorithm across the indexed data to determine which search fields are most commonly searched. If, for example, the machine learning algorithm identifies that only 0.5% of searches search by seat type, the algorithm may determine to remove that field from the search, in order to enhance the speed of the search or reduce the load of the search on computing hardware. In some embodiments, search fields identified as frequently searched fields by a machine learning algorithm may be presented to the user on the client device when prompting the user to enter search terms, thereby guiding the user in searching fields most commonly searched by other users.

Figure 5:
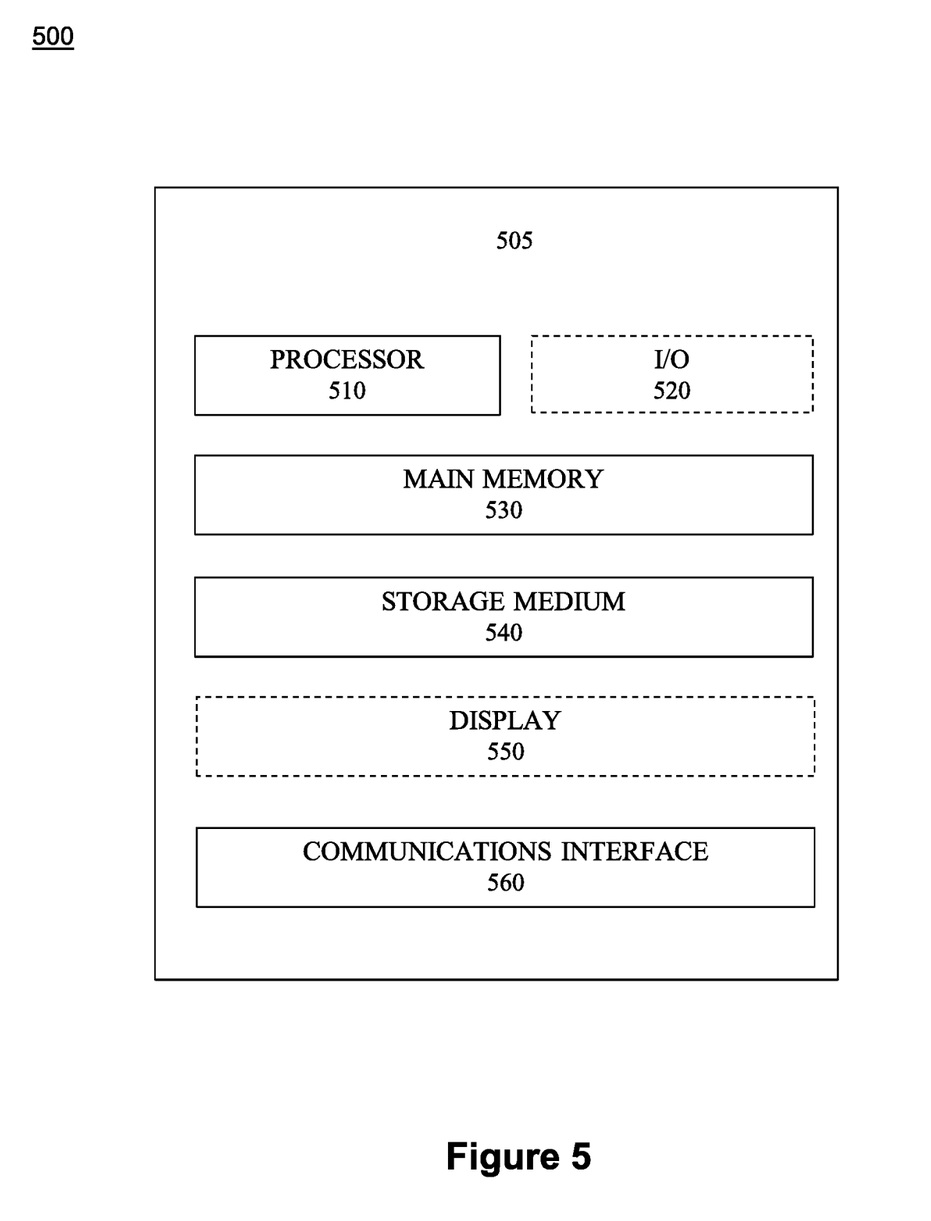
FIG. 5 illustrates a view of an example computer system for implementing embodiments and features consistent with the present disclosure.

FIG. 5 illustrates an example computer system 500 for implementing embodiments and features consistent with the present disclosure. Computer system 500 may include one or more computing devices 505. A computing device may include one or more processors 510 for executing instructions. Processors suitable for the execution of instructions include, by way of example, both general and special purpose microprocessors, and any one or more processors of any kind of digital computer. A computing device 505 may also include one or more input/output (I/O) devices 520. By way of example, I/O devices 520 may include keys, buttons, mice, joysticks, styluses, gesture sensors (e.g., video cameras), motion sensors (e.g., infrared sensors, ultrasound sensors), voice sensors (e.g., microphones), etc. Keys and/or buttons may be physical and/or virtual (e.g., provided on a touch screen interface).

A computing device 505 may include one or more storage devices configured to store data and/or software instructions used by processor(s) 510 to perform operations consistent with the disclosed embodiments. For example, a computing device 505 may include main memory 530 configured to store one or more software programs that, when executed by processor(s) 510, cause processor(s) 510 to perform functions or operations consistent with disclosed embodiments. By way of example, main memory 530 may include NOR or NAND flash memory devices, read only memory (ROM) devices, random access memory (RAM) devices, etc. A computing device 505 may also include one or more storage medium(s) 540. By way of example, storage medium(s) 540 may include hard drives, solid state drives, tape drives, redundant array of independent disks (RAID) arrays, etc. Although FIG. 5 illustrates only one main memory 530 and one storage medium 540, a computing device 505 may include any number of main memories 530 and storage mediums 540. Further, although FIG. 5 illustrates main memory 530 and storage medium 540 as part of computing device 505, main memory 530 and/or storage medium 540 may be located remotely and computing device 505 may be able to access main memory 530 and/or storage medium 540 via one or more network(s).

Storage medium(s) 540 may be configured to store data, and may store data received from one or more servers, (e.g., servers 182a-n), one or more databases (e.g., database 150), or one or more client devices (e.g., client device 120a-n). The data may take or represent various content or information forms, such as documents, textual content, graphical content, data from a data set, indexed data from a data set, data structures representing data of a data set, metadata associated with a data set, and any other type of information and/or content in which a user may be interested, or any combination thereof. The data may further include other data received, stored, and/or inferred by computer system 500, such as user preference information and/or any other data used for carrying out embodiments of the present disclosure.

A computing device 505 may also include one or more displays 550. Display(s) 550 may be implemented using one or more display panels, which may include, for example, one or more cathode ray tube (CRT) displays, liquid crystal displays (LCDs), plasma displays, light emitting diode (LED) displays, organic light emitting diode (OLED) displays, touch screen type displays, projector displays (e.g., images projected on a screen or surface, holographic images, etc.), field emission displays (FEDs), active matrix displays, vacuum fluorescent (VFR) displays, 3-dimensional (3-D) displays, electronic paper (e-ink) displays, microdisplays, or any combination of the above types of displays.

A computing device 505 may further include one or more communications interfaces 560. Communication interface(s) 560 may allow content, software, data, messages, and/or other information to be transferred between one or more servers (e.g., servers 182a-n), one or more database (e.g., database 150), and one or more client devices (e.g., client devices 120a-n). Examples of communication interface(s) 560 may include modems, network interface cards (e.g., an Ethernet card), communications ports, personal computer memory card international association (PCMCIA) slots and card, antennas, etc. Communication interface(s) 560 may transfer software, content, data, messages, or other information in the form of signals, which may be electronic, electromagnetic, optical, and/or other types of signals. The signals may be provided to/from communications interface 560 via a communication path (e.g., network(s) 130), which may be implemented using wired, wireless, cable, fiber optic, radio frequency (RF), and/or other communication channels.

A computing device 505 may have additional or fewer components depending on whether the computer system is a client device (e.g., client device 120a-n), server (e.g., server 182a-n), or database (e.g., database 150). For example, a server and/or database may not have input/output device(s) 520. A server and/or client device may also not have display(s) 550.

The subject matter disclosed herein can be implemented in digital electronic circuitry, or in computer software, firmware, or hardware, including the structural means disclosed in this specification and structural equivalents thereof, or in combination of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of computer programs include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, certain computers might also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices (e.g., EPROM, EEPROM, and flash memory devices), magnetic disks (e.g., internal hard disks or removable disks); magneto optical disks; and optical disks (e.g., CD and DVD disks). The processor and the memory can be supplemented by, or incorporated in, special purpose logic circuitry.

To provide for interaction with a user, some subject matter described herein can be implemented on a computer having a display device, e.g., a CRT (cathode ray tube) or LCD (liquid crystal display) monitor, for displaying information to the user, and a keyboard and a pointing device (e.g., a mouse, trackball, touchscreen), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

Some subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or a combination of such back end, middleware, and front end components. The components of the system can be interconnected by any form of medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the foregoing description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computer-implemented method for preparing a data set for searching, the method comprising:
   receiving, by a computer system comprising one or more processors, a request from a client device to upload a data set for use with an application;
   determining, by the computer system, whether the client device is authorized to upload the data set;
   sending, by the computer system, a request to the client device instructing a user to configure settings for the application;
   receiving, by the computer system, the settings for the application, the settings configuring a storage infrastructure for storing data associated with the application, and configuring an indexing process for indexing the data associated with the application, in response to selection of the settings by the user;
   receiving, by the computer system, the data set;
   processing, by the computer system, the data set to store the data set as an indexed data set in accordance with the configuration for the storage infrastructure and in accordance with the configuration for indexing the data; and
   providing, by the computer system, a notification of a status of the processing of the data set for display to the user on the client device.

2. The method of claim 1, wherein the settings include one or more of a format of the data set, a frequency in which data sets will be loaded, a volume of data to be stored and searched, and a preferred notification channel for providing status updates to the user.

3. The method of claim 2, wherein the settings include a format of the data set, and the format of the data set is one of a comma-separated values (CSV) format, a JavaScript Object Notation (JSON) format, a portable document file (PDF) format, a text file format, a hypertext markup language (HTML) format, or an extensible markup language (XML) format.

4. The method of claim 1, wherein the data set is a first data set, comprising:
   receiving, by the computer system, a request to upload a second data set for use with the application;
   identifying, by the computer system, that the settings have already been configured;
   receiving, by the computer system, the second data set;
   processing, by the computer system, the second data set to store the second data set as an indexed second data set in accordance with the settings; and
   providing, by the computer system, a notification of a status of the processing of the second data set for display to the user on the client device.

5. The method of claim 1, wherein the computer system is a first computer system, comprising receiving, by the first computer system, the data set from a second computer system, the second computer system receiving a portion of the data set from each of a plurality of client devices and combining the portions into the data set for providing to the first computer system.

6. The method of claim 1, comprising:
   determining, by the computer system, after processing the data set, that at least a portion of the data set was not stored or was not indexed; and
   providing, by the computer system, the notification in response to determining that the at least a portion of the data set was not stored or was not indexed, the notification indicating that the processing of the data set was unsuccessful.

7. The method of claim 1, wherein processing the data set to store the data set as an indexed data set in accordance with the determined configuration for the storage infrastructure and in accordance with the determined configuration for indexing the data includes breaking the data set into portions, and processing the portions in parallel across one or more processors.

8. The method of claim 1, wherein representational state transfer (REST) application programming interfaces (APIs) are used by the computer system to store data into the storage infrastructure, to modify indexed data, and/or to retrieve indexed data in response to a search.

9. The method of claim 1, wherein the data set includes data representing a vehicle inventory, further comprising:
   receiving, by the computer system, a search for data regarding vehicles within a proximity of a geographical location; and
   providing, by the computer system, a list of search results identifying vehicles within the proximity of the geographical location, the list of search results identifying the vehicles in an order based on the proximity of the vehicle to the geographical location.

10. The method of claim 9, wherein the client device is a first client device, the search is received from a second client device executing the application, and the list of search results are provided to the second client device.

11. The method of claim 1, comprising selecting, by the computer system, a number of computing devices on which to store the indexed data set, the number of computing devices selected being based at least in part on one or more of the settings received for configuring the storage infrastructure and the settings received for configuring the indexing.

12. The method of claim 11, wherein each of the computing devices is one of a processor or a storage device.

13. The method of claim 1 comprising:
   identifying, by the computer system, a first field of the indexed data set that is searched more frequently than a second field of the indexed data set; and
   adding, by the computer system in response to identifying the first field as being searched more frequently than the second field, an entry to a graphical user interface that allows a user on a client device to search for an attribute in the first field.

14. The method of claim 13, wherein the computer system identifies the first field as being searched more frequently than the second field by executing a machine learning algorithm across the indexed data set in the storage infrastructure.

15. A computer system for preparing a data set for searching, the computer system comprising:
   one or more memories storing instructions; and
   one or more processors that, when executing the instructions, are configured to:
   receive a request from a client device to upload a data set for use with an application;
   determine whether the client device is authorized to upload the data set;
   send a request to the client device instructing a user to configure settings for the application;
   receive the settings for the application, the settings configuring a storage infrastructure for storing data associated with the application, and configuring an indexing process for indexing the data associated with the application, in response to selection of the settings by the user;
   receive the data set;
   process the data set to store the data set as an indexed data set in accordance with the configuration for the storage infrastructure, and in accordance with the configuration for indexing the data; and
   provide a notification of a status of the processing of the data set for display to the user on the client device.

16. The computer system of claim 15, wherein the settings include one or more of a format of the data set, a frequency in which the data sets will be loaded, a volume of data to be stored and searched, and a preferred notification channel for providing status updates to the user.

17. The computer system of claim 15, wherein the one or more processors, when executing the instructions, are configured to:
   receive a request to upload a second data set for use with the application;
   identify that the settings have already been configured;
   receive the second data set;
   process the second data set to store the second data set as an indexed second data set in accordance with the settings; and
   provide a notification of a status of the processing of the second data set for display to the user on the client device.

18. The computer system of claim 15, wherein the one or more processors, when executing the instructions, are configured to select a number of computing devices on which to store the indexed data set, the number of computing devices selected being based at least in part on one or more of the settings received for configuring the storage infrastructure and the settings received for configuring the indexing.

19. The computer system of claim 18, wherein each of the computing devices is one of a processor or a storage device.

20. A computer-implemented method for preparing a data set for searching, the method comprising:
- receiving, by a computer system comprising one or more processors, a request from a client device to upload a data set for use with an application;
- identifying, by the computer system, that settings for the application, including settings for configuring a storage infrastructure for storing data associated with the application, and for configuring an indexing process for indexing the data associated with the application, have been configured for the application;
- receiving, by the computer system, the data set;
- processing, by the computer system, the data set to store the data set as an indexed data set in accordance with the settings; and
- providing, by the computer system, a notification of a status of the processing of the data set for display to a user on the client device.

* * * * *